United States Patent
Joseph et al.

[15] 3,678,029
[45] July 18, 1972

[54] ESTROGEN GLUCOSAMINIDES OF 2-AMINOGLUCOSE

[72] Inventors: Joseph Peter Joseph, Cliffside, N.J.; John Paul Dusza, Nanuet; Seymour Bernstein, New City, both of N.Y.

[73] Assignee: American Cyanamid Company, Stamford, Conn.

[22] Filed: Jan. 15, 1970

[21] Appl. No.: 3,219

[52] U.S. Cl. .................................................. 260/210.5, 260/999
[51] Int. Cl. .................................................................. C07c 173/00
[58] Field of Search ................................................. 260/210.5

[56] References Cited

UNITED STATES PATENTS 3,206,359 9/1965 Sarett et al. ....................... 260/210.5
3,449,321 6/1969 Joseph et al. ...................... 260/210.5

*Primary Examiner*—Lewis Gotts
*Assistant Examiner*—Johnnie R. Brown
*Attorney*—Ernest Y. Miller

[57] ABSTRACT

The preparation of steroidal-glucopyranosides by the reaction of an estradiol or substituted estradiol with a glucopyranose and subsequent transformations is described. These compounds are useful for their antifungal properties.

9 Claims, No Drawings

ESTROGEN GLUCOSAMINIDES OF 2-AMINOGLUCOSE

This invention relates to steroidal-sugars and methods of preparing the same.

The novel steroidal sugars of the invention may be illustrated by the following formula:

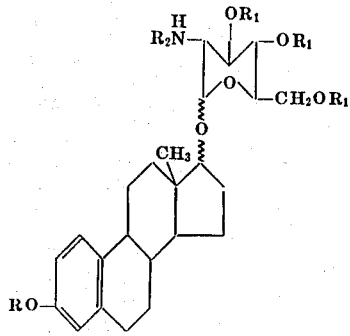

wherein R is hydrogen or benzyl; $R_1$ is hydrogen or lower alkanoyl and $R_2$ is hydrogen, lower alkanoyl or trifluoroacetyl, with the proviso that when the bond between the steroid and sugar is

then $R_2$ is hydrogen or trifluoroacetyl.

The present compounds are usually crystalline solids with relatively high melting points.

Compounds of this invention are prepared from starting materials such as 17β-estradiol, 17α-estradiol, 17β-estradiol-3-benzyl ether or 17α-estradiol-3-benzyl ether. These compounds may be illustrated by the following formula:

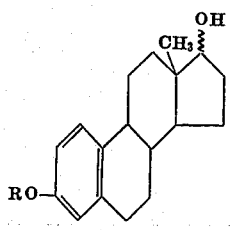

wherein R is hydrogen or benzyl.

The above steroids are reacted with a sugar of the formula:

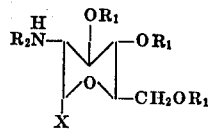

wherein $R_1$ is hydrogen or lower alkanoyl and $R_2$ is hydrogen, lower alkanoyl or trifluoroacetyl and X is chlorine or bromine.

The above reaction is carried out at a temperature of from about 80° to 160°C. for a period of from about 1 to 36 hours. Preferably the reaction is carried out at the refluxing temperature of the solvent. Solvents, such as, for example, benzene, toluene, chlorobenzene and the like, may be used. It is usually desirable to react the steroids described above with an excess of sugars as described.

In carrying out the present process, 17β-estradiol-3-benzyl ether (I) is heated in a solvent with 1α-chloro-1-deoxy-2-acetamido-2-deoxy-3,4,6-tri-O-acetyl-D-glucopyranoside to produce 3-benzyloxyestra-1,3,5(10)-trien-17β-yl-2'-acetamido-3',4',6'-tri-O-acetyl-2'-deoxy-β-D-glucopyranoside (II). Heating 17β-estradiol-3-benzyl ether (I) in a solvent with 1α-bromo-1-deoxy-2-trifluoroacetamido-2-deoxy-3,4,6-tri-O-acetyl-D-glucopyranoside produces 3-benzyloxyestra-1,3,5(10)-trien-17β-yl-3',4',6'-tri-O-acetyl-2'-deoxy-2'-trifluoroacetamido-β-D-glucopyranoside (III).

Hydrogenation of the latter compound with palladium on charcoal produces 3-hydroxyestra-1,3,5(10)-trien-17β-yl-3',4',6'-tri-O-acetyl-2'-deoxy-2'-trifluoroacetamido-β-D-glucopyranoside (IV). The latter compound when hydrolyzed in methanol-ammonia gives 3-hydroxyestra-1,3,5(10)-trien-17β-yl-2'-deoxy-2'-trifluoroacetamido-β-D-glucopyranoside (V). When 3-benzyloxyestra-1,3,5(10)-trien-17β-yl-3',4',6'-tri-O-acetyl-2'-deoxy-2'-trifluoroacetamido-β-D-glucopyranoside (III) is hydrolyzed with dilute alkali the compound 3-benzyloxyestra-1,3,5(10)-trien-17β-yl-2'-amino-2'-deoxy-β-D-glucopyranoside (VI) is obtained. The reaction of 3-benzyloxy-17β-estradiol with 1α-bromo-1-deoxy-2-trifluoroacetamido-2-deoxy-3,4,6-tri-O-acetyl-β-D-glucopyranoside gives compound (III) and also 3-benzyloxyestra-1,3,5(10)-trien-17β-yl-3',4',6'2'-deoxy-2'-trifluoroacetamido-α-D-glucopyranoside (VII). When the compound 3-benzyloxyestra-1,3,5(10)-trien-17β-yl-2'-acetamido-3',4',6'-tri-O-acetyl-2'-deoxy-β-D-glucopyranoside (II) is treated with methanol saturated with ammonia 3-benzyloxyestra-1,3,5(10)-trien-17β-yl-2'-acetamido-2'-deoxy-β-D-glucopyranoside (VIII) is obtained. When the latter compound is reduced with palladium in absolute ethanol the product 3-hydroxyestra-1,3,5-(10)-trien-17β-yl-2'-acetamido-2'-deoxy-β-D-glucopyranoside (IX) is obtained. The compound 3-benzyloxyestra-1,3,5(10)-trien-17β-yl-3',4',6'-tri-O-acetyl-2'-deoxy-2'-trifluoroacetamido-α-D-glucopyranoside (VII) when hydrolyzed with an alkali metal hydroxide in the presence of a lower alkanol produces 3-benzyloxyestra-1,3,5-(10)-trien-17β-yl-2'-amino-2'-deoxy-α-D-glucopyranoside (X). The latter compound when treated with pyridine and acetic anhydride produces 3-benzyloxyestra-1,3,5(10)-trien-17β-yl-3',4',6'-tri-O-acetyl-2'-acetamido-2'-deoxy-α-D-glucopyranoside (XI) which on treatment with ammonia in a solvent gives 3-benzyloxyestra-1,3,5(10)-trien-17β-yl-2'-acetamido-2'-deoxy-α-D-glucopyranoside (XII). Reduction of the latter compound with palladium in absolute ethanol gives 3-hydroxyestra-1,3,5(10)-trien-17β-yl-2'-acetamido-2'-deoxy-α-D-glucopyranoside (XIII). The reaction of 17α-estradiol and benzyl chloride gives 3-benzyloxyestra-1,3,5-(10)-trien-17α-ol (XV). The latter compound when reacted with 1α-bromo-1-deoxy-2-trifluoroacetamido-2-deoxy-3,4,6-tri-O-acetyl-β-D-glucopyranoside in the presence of cadmium carbonate and a solvent produces 3-benzyloxyestra-1,3,5(10)-trien-17α-yl-3',4',-6'-tri-O-acetyl-2'-deoxy-2'-trifluoroacetamido-β-D-glucopyranoside (XVI) which can be separated, and on further treatment of the residue gives 3-benzyloxyestra-1,3,5(10)-trien-17α-yl-3',4',6-tri-O-acetyl-2'-deoxy-2'-trifluoroacetamido-α-D-glucopyranoside (XVII). Treatment of compound (XVI) with an alkali metal hydroxide in a solvent produces 3-benzyloxyestra-1,3,5(10)-trien-17α-yl-2'-amino-2'-deoxy-β-D-glucopyranoside (XVIII). The latter compound reacted with pyridine and acetic anhydride produces 3-benzyloxyestra-1,3,5(10)-trien-17α-yl-3',4',6'-tri-O-acetyl-2'-deoxy-2'-acetamido-α-D-glucopyranoside (XIX) which when treated with methanol-ammonia gives 3-benzyloxyestra-1,3,5(10)-trien-17α-yl-2'-acetamido-2'-deoxy-β-D-glucopyranoside (XX). The latter compound when reduced with palladium in the presence of absolute ethanol produces 3-hydroxyestra-1,3,5(10)-trien-17α-yl-2'-acetamido-2'-deoxy-β-D-glucopyranoside (XXI).

The structures of the various compounds described above are given in the following flowsheet.

The compounds of the present invention are useful as fungicides and bacteriocides. Fungicides are of two general types, protective, which prevents further germination or eradicative. The present compounds are effective against the fungi Cryptococcus neoformans (E-138), Microsporium canis (ATCC 10214), Trichophyta tonsaurans (NIH-662), Trichophyta mentagrophytes (E-11) and Trichophyta rubrum (E-97). They are also effective against the bacteria Mycobacterium smegmatis (ATCC 606) and Streptococcus pyogenes (C-203).

FLOWSHEET
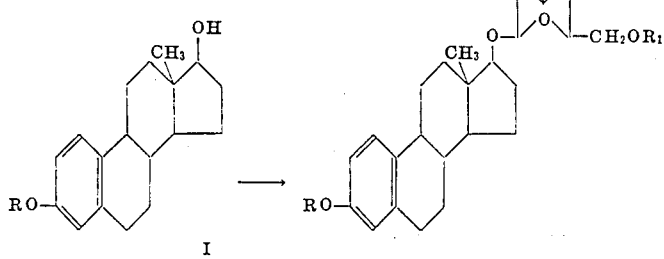
I
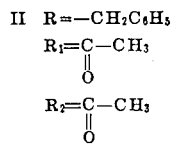
II  R=—CH₂C₆H₅
R₁=C—CH₃
‖
O
R₂=C—CH₃
‖
O
R=CH₂C₆H₅ ↓
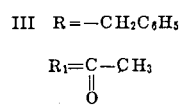
III  R=—CH₂C₆H₅
R₁=C—CH₃
‖
O
R₂=C—CF₃
‖
O
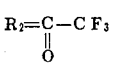
IV  R=H
R₁=C—CH₃
‖
O
R₂=—C—CF₃
‖
O
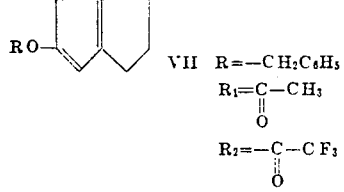
VII  R=—CH₂C₆H₅
R₁=C—CH₃
‖
O
R₂=—C—CF₃
‖
O
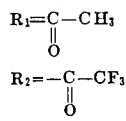
V  R=H
R₁=H
R₂=C—CF₃
‖
O
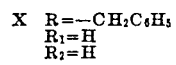
X  R=—CH₂C₆H₅
R₁=H
R₂=H
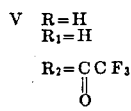
VI  R=—CH₂C₆H₅
R₁=H
R₂=H
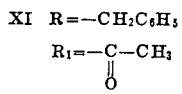
XI  R=—CH₂C₆H₅
R₁=—C—CH₃
‖
O
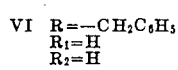
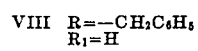
VIII  R=—CH₂C₆H₅
R₁=H
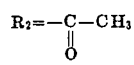
R₂=—C—CH₃
‖
O
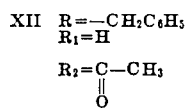
XII  R=—CH₂C₆H₅
R₁=H
R₂=C—CH₃
‖
O
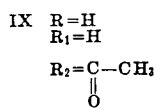
IX  R=H
R₁=H
R₂=C—CH₃
‖
O
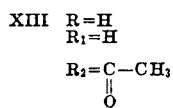
XIII  R=H
R₁=H
R₂=C—CH₃
‖
O

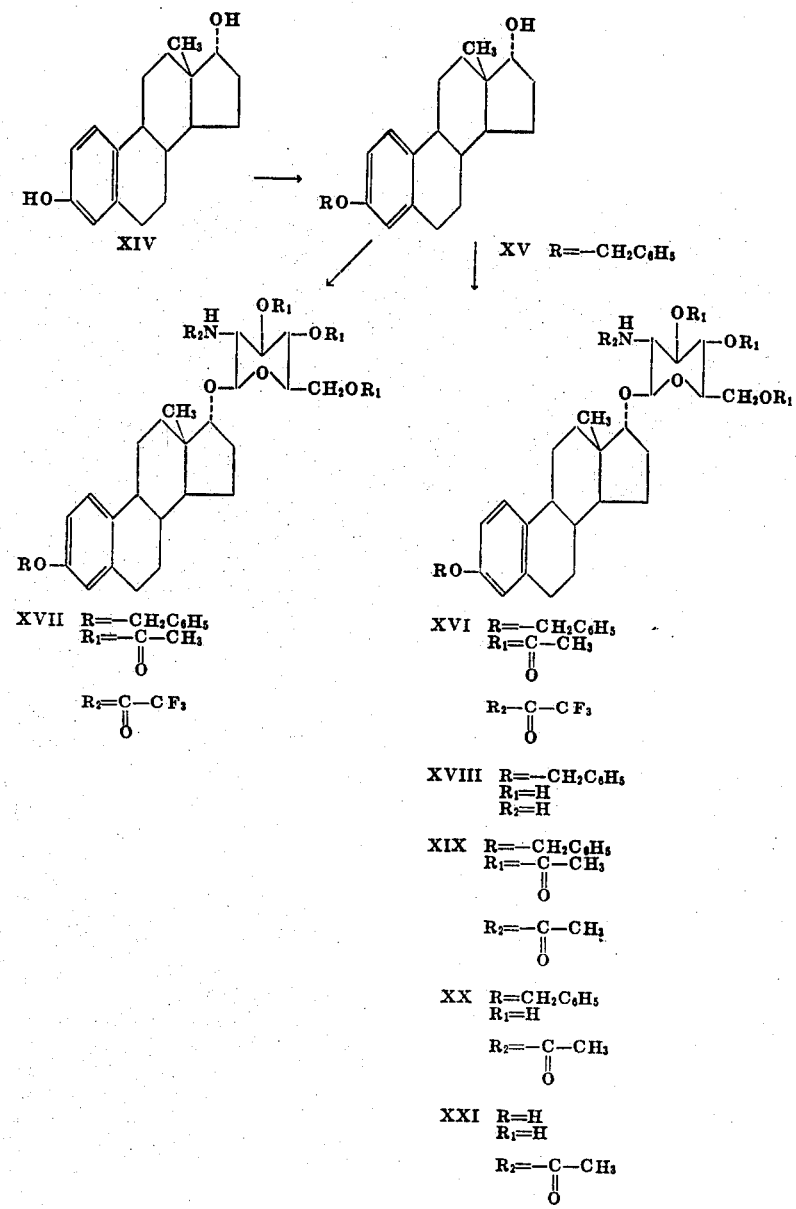

SPECIFIC DESCRIPTION

The following examples described in detail the preparation of representative compounds of this invention.

EXAMPLE 1

Preparation of 3-Benzyloxyestra-1,3,5(10)-triene-17β-yl-2'-acetamido-3',4',6'-tri-O-acetyl-2'-deoxy-β-D-glucopyranoside (II)

A. Using cadmium carbonate condensation

A well-stirred mixture of 543 mg. of 17β-estradiol-3-benzyl ether (I) and 519 mg. of cadmium carbonate in 90 ml. of benzene is distilled until 15 ml. of benzene is removed and then 1.00 g. of 1α-chloro-1-deoxy-2-acetamido-2-deoxy-3,4,6-glucopyranoside is added. The reaction is stirred under reflux with constant water removal for 18 hours. After filtering while hot the filtrate is evaporated under reduced pressure and the residue is acetylated in 2 ml. of pyridine and 1 ml. of acetic anhydride on a steam bath for 2 hours. Ice-water is added and the gum is collected, dissolved in methylene chloride and dried over magnesium sulfate. After filtration and evaporation there remains a gum which gives 111 mg. of II, on crystallization when triturated with anhydrous ether. The material is recrystallized from acetone-hexane to give 70 mg., melting point 224°–225°C.

B. Using Acetylation of Aminoglyoside

In 0.3 ml. of pyridine and 0.15 ml. of acetic anhydride 47 mg. of 3-benzyloxyestra-1,3,5(10)-trien-17β-yl-2'-amino-2'-deoxy-β-D-glucopyranoside is dissolved and allowed to remain at room temperature for 18 hours. After the addition of water there is obtained 44 mg. of a white solid whose infrared spectrum is identical with that of the material obtained by procedure A.

EXAMPLE 2

Preparation of 3-Benzyloxyestra-1,3,5(10)-trien-17β-yl-3',4',6'-tri-O-acetyl-2'-deoxy-2'-trifluoroacetamido-β-D-glucopyranoside (III)

To a solution of 905 gm. of 17β-estradiol-3-benzyl ether (I) in 150 ml. of toluene 865 mg. of cadmium carbonate is added and the mixture is stirred while 50 ml. of toluene is removed by distillation. There is then added 2.3 g. of 1α-bromo-1-deoxy-2-trifluoroacetamido-2-deoxy-3,4,6-tri-O-acetyl-β-D-glucopyranoside and the mixture is reduced for 18 hours. After filtration and evaporation under reduced pressure the crude residue is acetylated in 5 ml. of pyridine and 2.5 ml. of acetic anhydride on a steam bath for 2 hours. Ice-water is added and the semisolid mass is collected by filtration, washed with water and then dissolved in methylene chloride and passed through a pad of hydrous magnesium silicate. This is followed by several washings with methylene chloride. On evaporation there remains a gelatinous solid which on thin layer chromatography shows three principal spots, one corresponding to product (most polar), one to acetylated starting material — (least polar) and one slightly less polar than the product, the α-anomer of the glycoside. Trituration of the residue with ether gives 766 mg. (41 percent) of white crystalline product III, melting point 217°–218°C.

EXAMPLE 3

Preparation of 3-Hydroxyestra-1,3,5(10)-trien-17β-yl-3', 4',6'-tri-O-acetyl-2'-deoxy-2'-trifluoroacetamido-β-D-glucopyranoside IV The compound 3-benzyloxyestra-1,3,5(10)-trien-17β-yl-2'-trifluoroacetylamino-2'-deoxy-3',4',6'-tri-O-acetyl-β-D-glucopyranoside (III; 3.0 g.) is suspended in 100 ml. of glacial acetic acid and 1.0 g. of 10 percent palladium on charcoal is added. The mixture is hydrogenated at 40 psig for 3 hours at room temperature. After the catalyst is removed by filtration through diatomaceous earth the filtrate is evaporated under reduced pressure to a white solid (IV) (2.6 g.). Recrystallization of a sample from acetone-hexane to constant melting point gives melting point of 213°–215°C.

EXAMPLE 4

Preparation of 3-Hydroxyestra-1,3,5(10)-trien-17β-yl-2'-deoxy-2'-trifluoroacetamido-β-D-glucopyranoside (V)

In 20 ml. of methanol saturated at 0°–5°C. with ammonia 500 mg. of 3-hydroxyestra-1,3,5(10)-trien-17β-yl-2',3',4'O-acetranoside (IV) is dissolved and allowed to remain at 0°–5°C. for 18 hours protected from atmospheric moisture. The solvent and excess ammonia are removed under reduced pressure leaving a glass — this is triturated with water to remove acetamide present. There remains 371 mg. of glass of which 213 mg. is chromatographed on 2–20 × 20 cm plates coated with silica gel G., 0.5 mm thick, and developed in the system benzene:acetone:water (1:2:1) upper phase. There is only one major material which is eluted from the silica with acetone and evaporated to give (V) as a glass (162 mg.). This material shows one spot on thin layer but would not crystallize; it is dissolved in acetone, filtered through activated magnesium silicate evaporated to give the product of the example, $[\alpha]_D^{25} + 41°$ (methanol);

$\lambda_{max.}^{MeOH}$ 250–290 mμ

EXAMPLE 5

Preparation of 3-Benzyloxyestra-1,3,5(10)-trien-17β-yl-2'-amino-2'-deoxy-β-D-glucopyranoside (VI)

In 10 ml. of methanol is suspended 2.3 g. of 3-benzyloxyestra-1,3,5(10)-trien-17β-yl-3',4',6'2'-deoxy-2'-trifluoroacetamido-β-D-glucopyranoside (III), and 50 ml. of 1N potassium hydroxide in methanol and 10 ml. of water is added. All the solid dissolves and a new solid appears in approximately 15 minutes. After 3 hours at room temperature the deblocked aminoglucoside VI is collected, washed with cold methanol and dried, 1.3 g. (81 percent). A sample of the above material is recrystallized from methanol to constant melting point 238°–240°C.

EXAMPLE 6

Preparation of 3-Benzyloxyestra-1,3,5(10)-trien-17β-yl-3', 4',6'-O-acetyl-2'-deoxy-2'-trifluoroacetamido-β-D-glucopyranoside (III) and 3-Benzyloxyestra-1,3,5(10)-trien-17β-yl-3',4',6'2'-deoxy-2'-trifluoroacetamido-α-D-glucopyranoside (VII)

To 350 ml. of chlorobenzene and 17β-estradiol-3-benzyl ether (I, 3.0 g.) is added cadmium carbonate (2.9 g.) and 70 ml. of the solvent is distilled. With stirring, a solution of 4.2 g. of 1α-bromo-1-deoxy-2-trifluoroacetamido-2-deoxy-3,4,6-tri-O-acetyl-β-D-glucopyranoside in 50 ml. of dry chlorobenzene is added while the reaction is under reflux. After 2 ½ hours an additional 4.2 g. of the bromosugar in chlorobenzene is added, and the reaction is continued under reflux for 2 additional hours.

After removal of the inorganic material by filtration the solution is evaporated under reduced pressure and the residue is acetylated in 10 ml. of pyridine and 5 ml. of acetic anhydride for 4 hours at room temperature. This is to make the starting material (17β-estradiol-3-benzylether, I) less polar and more separable from the products in subsequent chromatography. The acetylated material is added to water and the gum which separates is collected, dried in methylene chloride solution with magnesium sulfate and passed through a filter pad of activated magnesium silicate. The activated magnesium silicate is washed with methylene chloride, and the combined wash and filtrate are evaporated under reduced pressure to a gum which partially crystallizes to give 2.3 g. of the β-isomer III, melting point 215°–218° which appeared to be homogeneous on thin layer chromatography (system: 70 cyclohexane: 30 ethyl acetate). The residue (7.5 g.) from the crystallization is submitted for partition chromatography on diatomaceous earth (system heptane:methanol) and 415 mg. of non-crystalline α-isomer (VII) 6.7 percent) is obtained with an additional 1.1 g. of β-isomer (III); total yield of β-isomer is 55 percent. Further purification of a sample of α-isomer is accomplished by preparative thin layer chromatography (system: 70 cyclohexane: 30 ethyl acetate); $[\alpha]_D^{25} + 87°$ (chloroform);

$\lambda_{max.}^{MeOH}$ 287 mμ (ε 900)

Anal.
Calcd. for $C_{39}H_{46}F_3NO_{10}$ (745.76): C, 62.81; H, 6.21; F, 7.64; N, 1.85.
Found:
C, 62.86; H, 6.13; F, 7.54; N, 1.81.

The β-isomer (III), $[\alpha]_D^{25}$ +16° (chloroform) is reported previously (see Example 2). A thin layer chromatogram of α- and β-isomers (system: 70 cyclohexane:30 ethyl acetate) shows the α-isomer to be slightly less polar than the β-isomer.

EXAMPLE 7

Preparation of 3-Benzyloxyestra-1,3,5(10)-trien-17β-yl-2'-acetamido-2'-deoxy-β-D-glucopyranoside (VIII)

Crude 3-benzyloxyestra-1,3,5(10)-trien-17β-yl-2'-acetamido-3',4',6'-tri-O-acetyl-2'-deoxy-β-D-glucopyranoside (930 mg., II) is gradually dissolved in 100 ml. of methanol saturated at 0°–5°C. with ammonia gas. After 48 hours at 0°–5°C. the solution is evaporated under reduced pressure to a white crystalline solid (624 mg., VIII), melting point 223°–225°C., dec. Recrystallization from methanol did not alter the melting point.

EXAMPLE 8

Preparation of 3-Hydroxyestra-1,3,5(10)-trien-17β-yl-2'-acetamido-2'-deoxy-β-D-glucopyranoside (IX)

In 100 ml. of absolute ethanol 17β-estradiol-3-benzyl ether-17β-N-acetylglucosaminide (423 mg., VIII) is dissolved and 150 mg. of 10% palladium-on-charcoal is added. The mixture is hydrogenated at 40 psig for 4 hours at room temperature and the catalyst is removed by filtration through diatomaceous earth. Removal of solvent gives a crystalline solid (331 mg., IX). Recrystallization from absolute ethanol-hexane gives melting point of 305°–309°C., dec.

EXAMPLE 9

Preparation of 3-Benzyloxyestra-1,3,5(10)-trien-17β-yl-2'-amino-2'-deoxy-α-D-glucopyranoside (X)

A solution of the blocked α-glycoside (VII, 246 mg.) in 4 ml. of 1 N potassium hydroxide in methanol gives a white solid which is collected after 4 hours at room temperature which is washed with water and dried. There is obtained 147 mg. of X, melting point 198°–209°C.

EXAMPLE 10

Preparation of 3-Benzyloxyestra-1,3,5(10)-trien-17β-yl-2'-acetamido-2'-deoxy-α-D-glucopyranoside (XII)

In 2 ml. of pyridine and 1 ml. of acetic anhydride the unblocked glycoside (X, 180 mg.) is dissolved and left at room temperature for 3 days. When the solvent is removed and ice-water is added 221 mg. of the tetraacetate, 3-benzyloxyestra-1,3,5(10)-trien-17β-yl-3',4',6'2'-deoxy-2'-acetamido-α-D-glucopyranoside (XI) as a yellow white solid is collected, and dried. This is dissolved in 1 ml. of methylene chloride, and added to a solution of ammonia gas in methanol (saturated at 0°C.). After 18 hours at 0°–5°C., the solvent is removed and the acetamidoglycoside (XII, 154 mg.) is obtained, melting point 225°–226°C., dec.

EXAMPLE 11

Preparation of 3-Hydroxyestra-1,3,5(10)-trien-17β-yl-2'-acetamido-2'-deoxy-α-D-glucopyranoside (XIII)

The 17β-estradiol-3-benzylether-17α-acetamidoglucoside (XII, 153 mg.) is dissolved in 100 ml. of absolute ethanol and 60 mg. of 10 percent palladium on charcoal is added. The solution is hydrogenated at 40 psig for 4 hours. The catalyst is removed by filtration through diatomaceous earth, and the filtrate is evaporated leaving XIII as a white solid, 128 mg. This material did not readily recrystallize and is purified on 4–20 × 20 cm silica gel G plates [system: benzene:acetone:water (2:1:2) upper phase 70 percent:methanol 30 percent] to give 81 mg. of white crystals of XIII, melting point 189°–192°, dec., $[\alpha]_D^{25} + 150°$ (ethanol).

EXAMPLE 12

Preparation of 3-Benzyloxy-17α-hydroxyestra-1,3,5(10)-triene (XV)

To a solution of 750 mg. of 17α-estradiol (XIV) in 40 ml. of absolute ethanol 1.7 g. of pulverized anhydrous potassium carbonate and 1.5 ml. of benzyl chloride is added, and the mixture is heated under reflux for 3 hours. After the addition of water the reaction is concentrated under reduced pressure, and ice is added. The residue partially solidified and is collected by filtration through diatomaceous earth. The gummy solid is dissolved in methylene chloride, and dried over magnesium sulfate, filtered and evaporated under reduced pressure to a gum which crystallized from acetone-hexane to give 675 mg. of XV. A sample is recrystallized from hexane, melting point 88°–89°C.

EXAMPLE 13

Preparation of 3-Benzyloxyestra-1,3,5(10)-trien-17α-yl-3', 4',6'-tri-O-acetyl-2'-deoxy-2'-trifluoroacetamido-β-D-glucopyranoside (XVI) and 3-Benzyloxyestra-1,3,5(10)-trien-17α-yl-3,4',6'2'-deoxy-2'-trifluoroacetamido-α-D-blucopyranoside (XVII)

In 30 ml. of dry benzene 17α-estradiol-3-benzylether (XV, 454 mg.) is dissolved, and to this is added cadmium carbonate (430 mg.). The mixture is stirred and 5 ml. is distilled. To the reaction mixture under distillation conditions is added 1.2 g. of 1α-bromo-1-deoxy-2-trifluoroacetamido-2-deoxy-3,4,6-tri-O-acetyl-β-D-glucopyranoside in 46 ml. of dry benzene over approximately one-fourth hour. The reaction is kept under reflux with water removal and stirred for 6 hours total. The solid material is removed by filtration and washed with methylene chloride. The filtrate and wash are combined, evaporated under reduced pressure and acetylated for 18 hours at room temperature in 2 ml. of pyridine and 1 ml. of acetic anhydride. The crude acetylated product is isolated as a gum which is dissolved in 5 ml. of methanol and added to 200 ml. of methanol saturated with ammonia at 0°–5°C. After 18 hours at 5°C. the methanol is removed under reduced pressure and the residue is dissolved in methylene chloride, washed with water and dried over magnesium sulfate. After filtration and evaporation the residual gum showed by thin layer chromatography (system: 70 percent cyclohexane:30 percent ethyl acetate) one polar spot and two very less polar materials which are removed by trituration with refluxing hexane. The residue is reacetylated in 2 ml. of pyridine and 1 ml. of acetic anhydride for 18 hours at room temperature. After excess reagents are removed under reduced pressure, the residue is dissolved in methylene chloride, washed with water twice and then dried over magnesium sulfate. There results a tacky solid which on trituration with ether gives 200 mg. of XVI as white crystals, melting point 188°–189°C., $[\alpha]_D^{25}$ −24° (chloroform).

Anal. Calcd. for $C_{39}H_{46}F_3NO_{10}$ (745.76):
C, 62.81; H, 6.21; F, 7.64; N, 1.85.
Found:
C, 62.91; H, 6.04; F, 7.62; N, 1.76.

The residue from the ether trituration above contains the α and some residual β-anomer with some non-polar materials and is plated on 2–20 × 20 cm silica gel plates (500 micron thickness). After development in system 70 percent cyclohexane:30 percent ethyl acetate the very non-polar material is discarded and the more polar β-anomer (181 mg.) is separated from the less polar α-anomer (56 mg.). The total β-anomer weight is 397 mg. (43 percent). The α-anomer, XVII, (2.3 percent), $[\alpha]_D^{25} + 52°$ (chloroform).

EXAMPLE 14

Preparation of 3-Benzoyloxyestra-1,3,5(10)-trien-17α-yl-2'-amino-2'-deoxy-β-D-glucopyranoside (XVIII)

In 10 ml. of 1 N potassium hydroxide in methanol 197 mg. of 3-benzyloxyestra-1,3,5(10)-trien-17α-yl-3',4',6'-tri-O-acetyl-2'-deoxy-2'-trifluoroacetamido-β-D-glucopyranose (XVI) is dissolved and allowed to remain at room temperature for 3 hours and at 0°–5°C. for 18 hours. Evaporation under reduced pressure gives 138 mg. of an amorphous product. Purification on 2 successive 20 × 20 cm silica gel plates (250 microns thickness), solvent system:[benzene, acetone, water (2:1:2) upper phase 70 percent, methanol 30 percent], gives 20 mg. of product (XVIII which is amorphous; $[\alpha]_D^{25}$ −1.1° (pyridine);

$$\lambda_{max.}^{MeOH} \ 278–288 \ m\mu \ (\epsilon \ 200)$$

EXAMPLE 15

Preparation of 3-Benzyloxyestra-1,3,5(10)-trien-17α-yl-2'-acetamido-2'-deoxy-β-D-glucopyranoside (XX)

Crude 3-benzyloxyestra-1,3,5(10)-trien-17α-yl-2'-amino-2'-deoxy-β-D-glucopyranoside (XVIII, 434 mg.) is dissolved in 4 ml. of pyridine and 2 ml. of acetic anhydride, and allowed to remain at room temperature for 18 hours. Reagents are removed under reduced pressure, and the residue is dissolved in methylene chloride. After a wash with excess saturated sodium bicarbonate solution and water, the solvent is dried over magnesium sulfate, filtered and evaporated leaving a white solid (537 mg. XIX), 3-benzyloxyestra-1,3,5(10)-trien- 17α-yl-3',4',6'2'-deoxy-2'-acetamido-β-D-glu-copyranoside which gives essentially one spot on thin layer chromatography (system: 70 percent cyclohexane:30 percent ethyl acetate) an infrared curve shows that both O and N acetylation has occurred.

In 200 ml. of methanol saturated at 0° with ammonia gas 3-benzyloxyestra-1,3,5(10)-trien-17α-yl-2'-acetamido-3',4'-6'-tri-O-acetyl-2'-deoxy-β-D-glucopyranoside (XIX, 535 mg.) is dissolved and allowed to remain at 0°–5°C. for 18 hours. After evaporation under reduced pressure the solid is triturated with water, and then with hexane to give the de-O-acetylated material (XX, 366 mg.). A sample is recrystallized from acetone-hexane, melting point 120°–130°C., dec.

EXAMPLE 16

Preparation of 3-Hydroxyestra-1,3,5(10)-trien-17α-yl-2'-acetamido-2'-deoxy-β-D-glucopyranoside (XXI)

In 100 ml. of absolute ethanol 3-benzyloxyestra-1,3,5-(10)-trien-17α-yl-2'-acetamido-2'-deoxy-β-D-glucopyranoside (XX, 306 mg.) is dissolved and 120 mg. of 10 percent palladium-on-carbon is added. The mixture is hydrogenated at 40 psig for 3 hours. The catalyst is removed by filtration through diatomaceous earth and the filtrate is evaporated under reduced pressure leaving a glass which crystallizes to give 266 mg. of the 3-hydroxy compound (XXI).

One recrystallization from ethanol-water gives 173 mg. of needles, melting point 185°–190°C., dec.

We claim:
1. A steroidal-glucopyranoside of the formula:

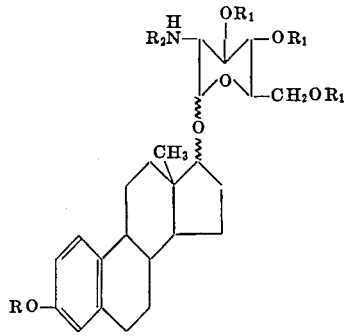

wherein R is hydrogen or benzyl; $R_1$ is hydrogen or lower alkanoyl and $R_2$ is hydrogen, lower alkanoyl or trifluoroacetyl with the proviso that when the bond between the steroid and glucopyranoside is $$\frac{\alpha}{-}-O\frac{\beta}{-},$$

then $R_2$ is hydrogen or trifluoroacetyl.

2. The steroidal-glucopyranoside according to claim 1, 3-benzyloxyestra-1,3,5(10)-trien-17β-yl-2'-acetamido-3',4',6'-tri-O-acetyl-2'-deoxy-β-D-glucopyranoside.

3. The steroidal-glucopyranoside according to claim 1, 3-benzyloxyestra-1,3,5(10)-trien-17β-yl-3',4',6'2'-deoxy-2'-trifluoroacetamido-β-D-glucopyranoside.

4. The steroidal-glucopyranoside according to claim 1, 3-hydroxyestra-1,3,5(10)-trien-17β-yl-3',4',6'2'-deoxy-2'-trifluoroacetamido-β-D-glucopyranoside.

5. The steroidal-glucopyranoside according to claim 1, 3-hydroxyestra-1,3,5(10)-trien-17β-yl-2'-deoxy-2'-trifluoroacetamido-β-D-glucopyranoside.

6. The steroidal-glucopyranoside according to claim 1, 3-benzyloxyestra-1,3,5(10)-trien-17β-yl-2'-amino-2'-deoxy-β-D-glucopyranoside.

7. The steroidal-glucopyranoside according to claim 1, 3-hydroxyestra-1,3,5(10)-trien-17β-yl-2'-acetamido-2'-deoxy-β-D-glucopyranoside.

8. The steroidal-glucopyranoside according to claim 1, 3-benzyloxyestra-1,3,5(10)-trien-17β-yl-2'-amino-2'-deoxy-α-D-glucopyranoside.

9. The steroidal-glucopyranoside according to claim 1, 3-benzyloxyestra-1,3,5(10)-trien-17α-yl-2'-amino-2'-deoxy-β-D-glucopyranoside.

* * * * *

UNITED STATES PATENT OFFICE
CERTIFICATE OF CORRECTION

Patent No. 3,678,029        Dated July 18, 1972

Inventor(s) Joseph Peter Joseph, John Paul Dusza and Seymour Bernstein

It is certified that error appears in the above-identified patent and that said Letters Patent are hereby corrected as shown below:

Column 8, Example 6, please change Example title from:

Preparation of 3-Benzyloxyestra-1,3,5(10)-trien-17β-yl-3',4',6'-O-acetyl-2'-deoxy-2'-trifluoro-acetamido-β-D-glucopyranoside (III) and 3-Benzyloxyestra-1,3,5(10)-trien-17β-yl-3',4',6',2'-deoxy-2'-trifluoroacetamido-α-D-glucopyranoside (VII)

to read:

Preparation of 3-Benzyloxyestra-1,3,5(10)-trien-17β-yl-3',4',6'-O-acetyl-2'-deoxy-2'-trifluoro-acetamido-β-D-glucopyranoside (III) and 3-Benzyloxyestra-1,3,5(10)-trien-17β-yl-3',4',5',6'-tri-O-acetyl-2'-deoxy-2'-trifluoroacetamido-α-D-glucopyranoside (VII)

Column 9, Example 13, please change Example title from:

Preparation of 3-Benzyloxyestra-1,3,5(10)-trien-17α-yl-3',4',6'-tri-O-acetyl-2'-deoxy-2'-trifluoro-acetamido-β-D-glucopyranoside (XVI) and 3-Benzyloxyestra-1,3,5-(10)-trien-17α-yl-3',4',6',2'-deoxy-2'-trifluoroacetamido-α-D-glucopyranoside (XVII)

to read:

(continued)

FORM PO-1050 (10-69)

UNITED STATES PATENT OFFICE
CERTIFICATE OF CORRECTION

Patent No. 3,678,029    Dated July 18, 1972

Inventor(s) Joseph Peter Joseph, John Paul Dusza and Seymour Bernstein

It is certified that error appears in the above-identified patent and that said Letters Patent are hereby corrected as shown below:

> Preparation of 3-Benzyloxyestra-1,3,5-(10)-trien-17α-yl-3',4',6'-tri-O-acetyl-2'-deoxy-2'-trifluoroacetamido-β-D-glucopyranoside (XVI) and 3-Benzyloxyestra-1,3,5(10)-trien-17α-yl-3',4',6'-tri-O-acetyl-2'-deoxy-2'-trifluoroacetamido-α-D-glucopyranoside (XVII)

Signed and sealed this 2nd day of January 1973.

(SEAL)
Attest:

EDWARD M. FLETCHER, JR.
Attesting Officer

ROBERT GOTTSCHALK
Commissioner of Patents